(12) United States Patent
Dasgupta et al.

(10) Patent No.: US 9,489,624 B2
(45) Date of Patent: Nov. 8, 2016

(54) METHOD AND SYSTEM FOR RECOMMENDING CROWDSOURCING PLATFORMS

(71) Applicant: Xerox Corporation, Norwalk, CT (US)

(72) Inventors: Koustuv Dasgupta, Bangalore (IN); Vaibhav Rajan, Bangalore (IN); Kovendhan Ponnavaikko, Tamil Nadu (IN); Karanam Saraschandra, Karnataka (IN)

(73) Assignee: Xerox Corporation, Norwalk, CT (US)

( * ) Notice: Subject to any disclaimer, the term of this patent is extended or adjusted under 35 U.S.C. 154(b) by 194 days.

(21) Appl. No.: 13/794,861

(22) Filed: Mar. 12, 2013

(65) Prior Publication Data

US 2014/0279780 A1 Sep. 18, 2014

(51) Int. Cl.
 G06F 17/00 (2006.01)
 G06N 5/02 (2006.01)
 G06N 5/04 (2006.01)
 G06Q 30/02 (2012.01)

(52) U.S. Cl.
 CPC ........... *G06N 5/02* (2013.01); *G06N 5/04* (2013.01); *G06Q 30/02* (2013.01)

(58) Field of Classification Search
 None
 See application file for complete search history.

(56) References Cited

U.S. PATENT DOCUMENTS

| | | | |
|---|---|---|---|
| 8,200,527 B1 * | 6/2012 | Thompson et al. ......... | 705/7.39 |
| 2003/0088449 A1 * | 5/2003 | Menninger ...................... | 705/8 |
| 2003/0229529 A1 * | 12/2003 | Mui et al. ........................ | 705/8 |
| 2004/0010486 A1 * | 1/2004 | MacQueen et al. .............. | 707/1 |
| 2006/0149695 A1 * | 7/2006 | Bossman et al. ............... | 706/48 |
| 2008/0243581 A1 * | 10/2008 | Jennings ........................... | 705/9 |
| 2010/0293026 A1 * | 11/2010 | Vojnovic et al. ................ | 705/8 |
| 2012/0088220 A1 * | 4/2012 | Feng et al. .................... | 434/362 |

OTHER PUBLICATIONS

US Dept. of the Interior Office of Personnel Policy "Workforce Planning Instruction Manual" Aug. 2001.*
"Palantir: Crowdsourced Newsification Using Twitter"—Prithvi Raj Venkat Raj a Thesis Presented to the Graduate School of the University of Florida in Partial Fulfillment of the Requirements for the Degree of Master of Science University of Florida 2012.*
U.S. Appl. No. 13/350,965, filed Jan. 16, 2012; Roy et al; Feedback Based Technique Towards Total Completion of Tasks in Crowdsourcing.
U.S. Appl. No. 13/592,710, filed Aug. 23, 2012; Gujar et al; Method and System for Recommending Crowdsourcability of a Business Process.
"Levenshtein distance", from Wikipedia, the free encyclopedia; http://en.wikipedia.org/wiki/Levenshtein_distance.

(Continued)

*Primary Examiner* — Kakali Chaki
*Assistant Examiner* — Luis Sitiriche

(57) ABSTRACT

A method and system for recommending one or more crowdsourcing platforms from a plurality of crowdsourcing platforms to a requester is disclosed. The method includes receiving values corresponding to one or more parameters of one or more tasks from the requester. In response to the received values recommending the one or more crowdsourcing platforms to the requester based on the values and one or more statistical models maintained for the one or more crowdsourcing platforms, wherein the one or more statistical models corresponds to mathematical models representing performances of the one or more crowdsourcing platforms over a period of time.

18 Claims, 8 Drawing Sheets

(56) References Cited

OTHER PUBLICATIONS

Amazon Mechanical Turk, API Reference (API Version Mar. 25, 2012)—GetRequesterStatistic; http://docs.amazonwebservices.com/AWSMechTurk/latest/AWSMturkAPI/ApiReference_GetRequesterStatisticOperation.html.

"The World's Largest Workforce"—Crowdsourcing, Labor on Demand https://www.crowdflower.com/.

"The world's most accurate virtual workforce", Enterprise Crowdsourcing Platform-MorileWorks.com; https://www.mobileworks.com/.

"A computer Scientist in a Business School", Panos Ipeirotis, pp. 1-19, http://www.behind-the-enemy-lines.com/.

* cited by examiner

METHOD AND SYSTEM FOR RECOMMENDING CROWDSOURCING PLATFORMS

TECHNICAL FIELD

The presently disclosed embodiments are related to crowdsourcing. More particularly, the presently disclosed embodiments are related to a method and system for recommending a crowdsourcing platform from a plurality of crowdsourcing platforms to a requester.

BACKGROUND

In an environment in which business tasks are to be crowdsourced, it's necessary to find a suitable crowdsourcing platform that meets the enterprise level requirements. The enterprise level requirements are represented in the form of a plurality of tasks which are diverse in nature and have varying requirements in terms of quality of work expected from crowdworkers in a crowdsourcing platform. The recent mushrooming of crowdsourcing platforms makes it difficult for enterprises looking to leverage the varied abilities of crowdworkers for fulfilling the requirements of the plurality of tasks. Recent experiments provide some valuable insight into how the quality of work expected from the crowdworkers varies from one crowdsourcing platform to another. However, since the crowdsourcing platforms are composed of a heterogeneous mix of the crowdworkers it becomes difficult for the enterprises to predict the variation and the quality of work that can be delivered by the crowdsourcing platform.

Some solutions offer static recommendations of the crowdsourcing platforms by predicting the quality of work based on human experience or aggregate summaries. There are solutions which circumvent this problem by trying to improve the quality after the plurality of tasks have already been assigned to crowdsourcing platforms by posting additional Human Intelligence Tasks (HITs) for the plurality of tasks, reposting the plurality of tasks, or reposting the plurality of tasks with added payments. There are other solutions which try to identify the skilled workers within crowdsourcing platforms for the requirements of the plurality of tasks in order to improve the quality of work. However, these solutions are unable to offer qualitative prediction of the quality of work for the requirements of the plurality of tasks. Also, these solutions increase the overheads due to un-informed assignment of the plurality of tasks. Furthermore, these solutions rely on human inputs which may be erroneous, outdated, or even manipulated.

SUMMARY

According to embodiments illustrated herein, there is provided a computer-implemented method for recommending one or more crowdsourcing platforms from a plurality of crowdsourcing platforms to a requester. The computer-implemented method includes receiving values corresponding to one or more parameters of one or more tasks. In response to the received values, the computer-implemented method recommends the one or more crowdsourcing platforms to the requester based on the values and one or more statistical models maintained for the one or more crowdsourcing platforms, wherein the one or more statistical models corresponds to mathematical models representing performances of the one or more crowdsourcing platforms over a period of time.

According to embodiments illustrated herein, there is provided a system for recommending one or more crowdsourcing platforms from a plurality of crowdsourcing platforms to a requester. The system includes a specification module, and a recommendation module. The specification module is configured for receiving values corresponding to one or more parameters of the one or more tasks. The recommendation module is configured for recommending the one or more crowdsourcing platforms to the requester based on the received values and one or more statistical models maintained for the one or more crowdsourcing platforms, wherein the one or more statistical models represent performances of the one or more crowdsourcing platforms over a time period.

According to embodiments illustrated herein, there is provided a computer program product for use with a computer. The computer program product includes a computer-usable data carrier storing a computer-readable program code embodied therein for recommending one or more crowdsourcing platforms from a plurality of crowdsourcing platforms to a requester. The computer-readable program code includes a program instruction means for receiving values corresponding to one or more parameters of the one or more tasks. The computer-readable program code also includes a program instruction means for recommending the one or more crowdsourcing platforms to the requester based on the values received and one or more statistical models maintained for the one or more crowdsourcing platforms, wherein the one or more statistical models corresponds to mathematical models representing performances of the one or more crowdsourcing platforms over a period of time.

BRIEF DESCRIPTION OF DRAWINGS

The accompanying drawings illustrate various embodiments of systems, methods, and various other aspects of the invention. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which:

Figure 5B:
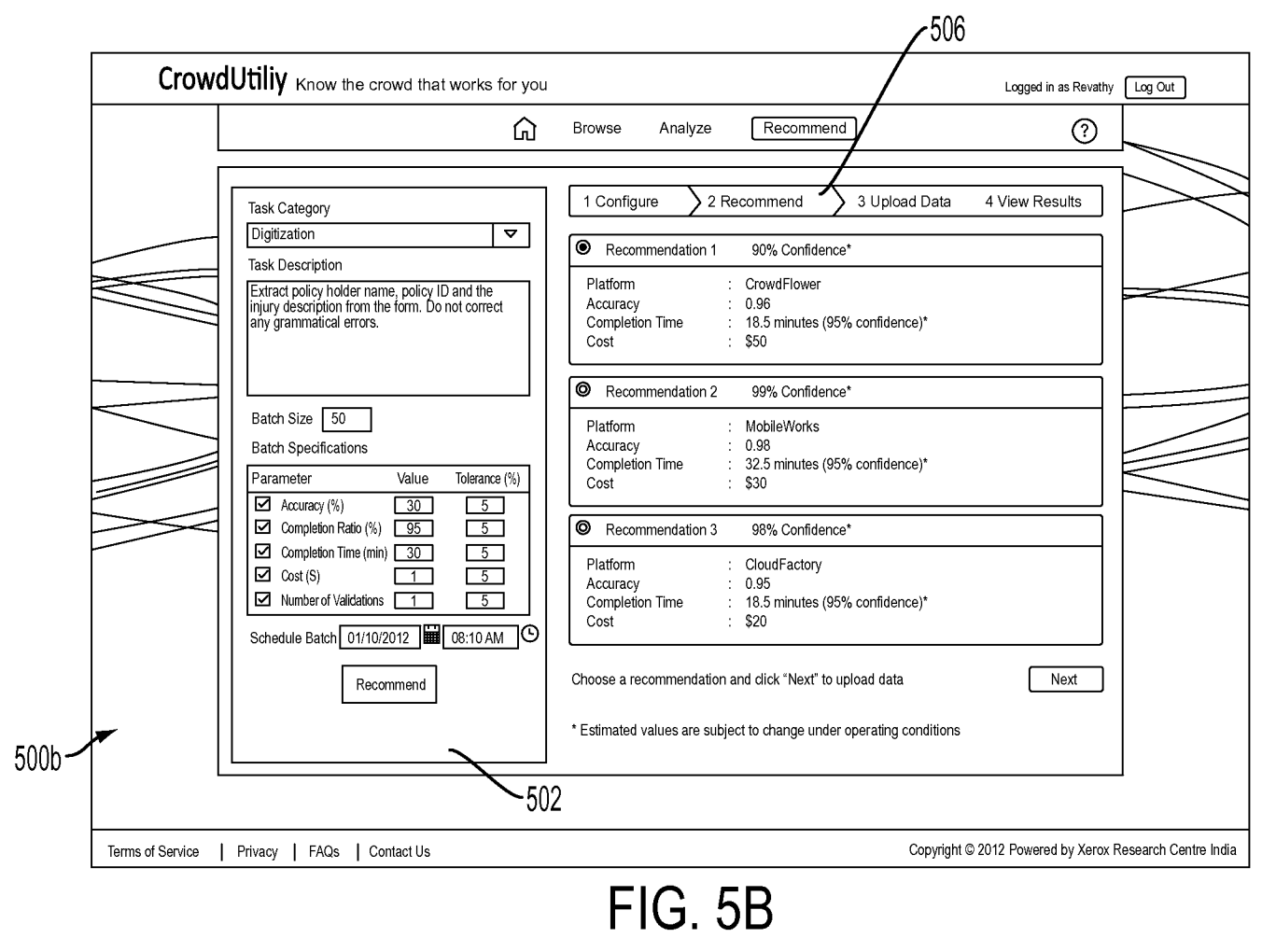
Figure 5C:
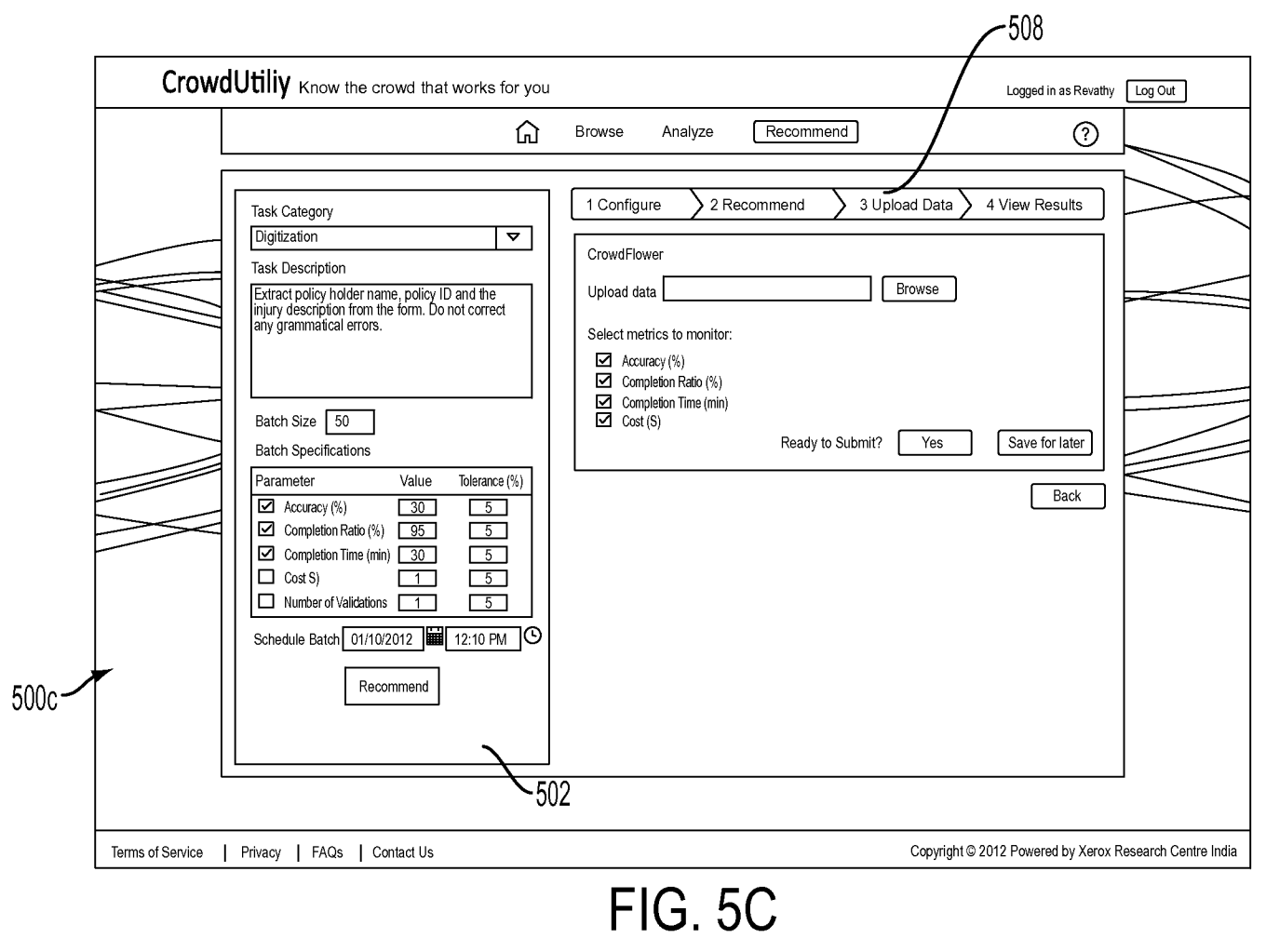
Figure 5D:
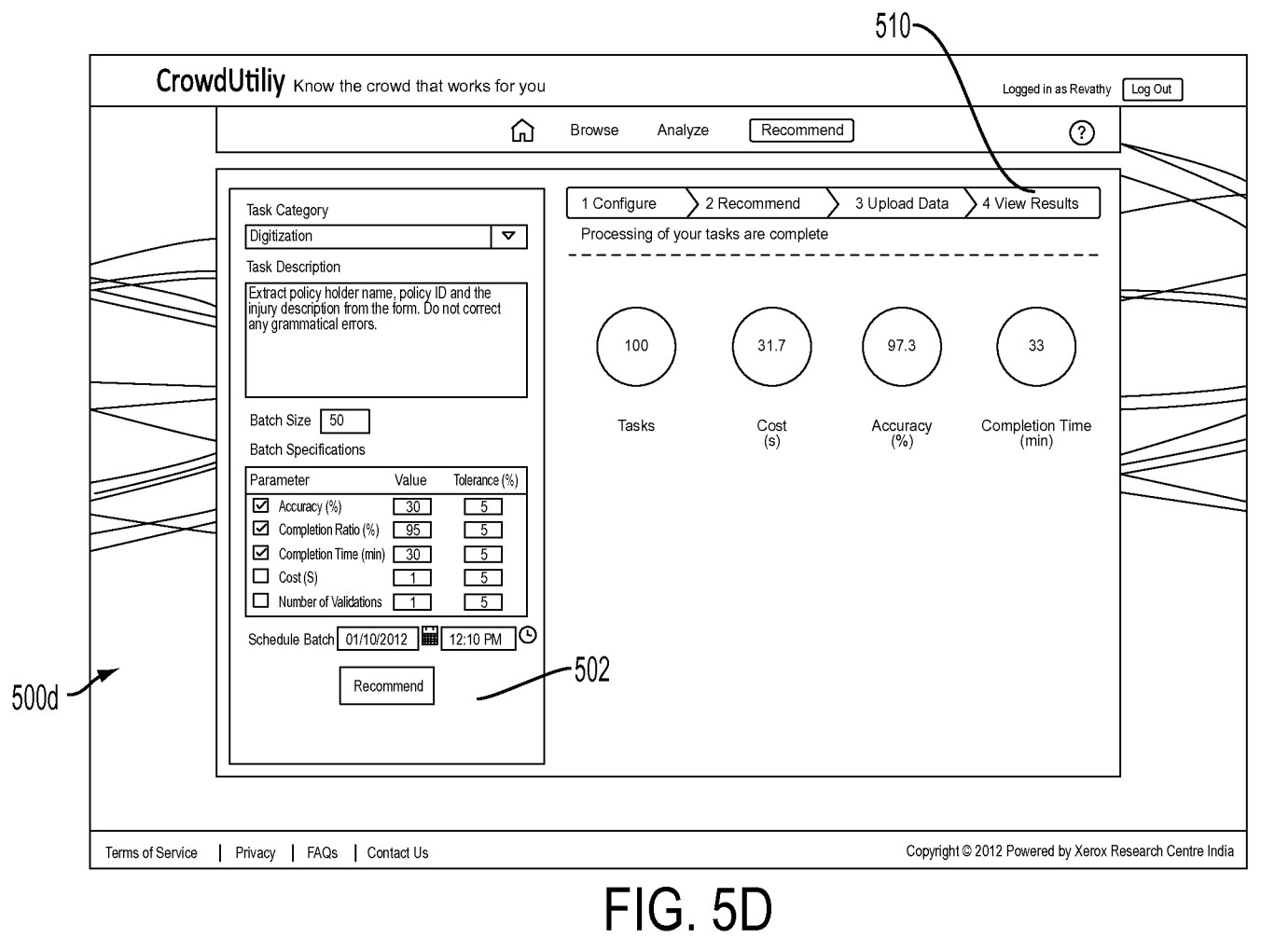

FIGS. 5A, 5B, 5C, and 5D depict various user interfaces, in accordance with at least one embodiment.

DETAILED DESCRIPTION

Figure 1:
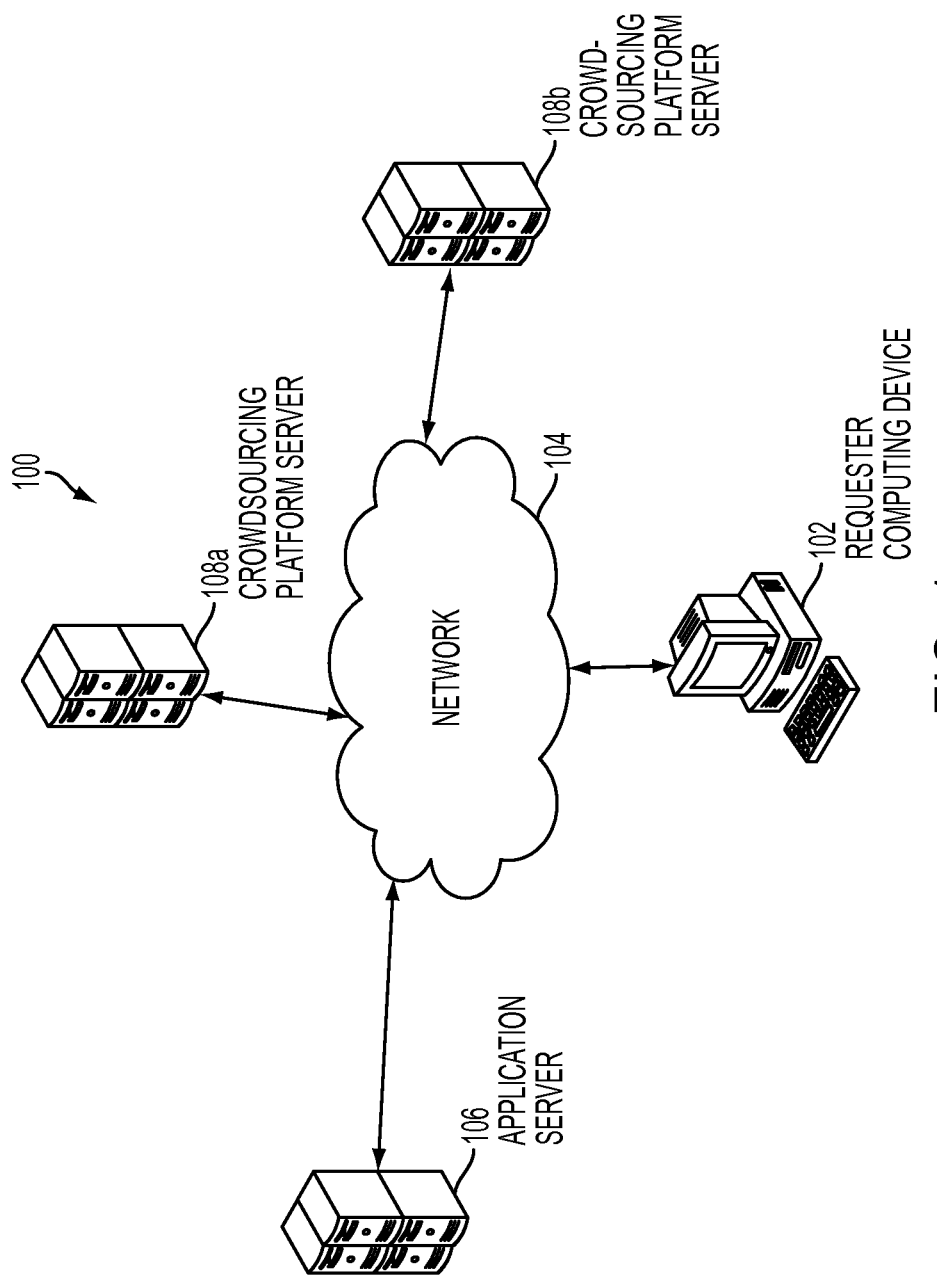
FIG. 1 is a block diagram illustrating a system environment, in accordance with at least one embodiment.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "network" refers to a medium that interconnects various computing devices, crowdsourcing platform servers, and an application server. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "computing device" refers to a computer, a device including a processor/microcontroller and/or any other electronic component, or a device or a system that performs one or more operations according to one or more programming instructions. Examples of the computing device include, but are not limited to, a desktop computer, a laptop, a personal digital assistant (PDA), a tablet computer and the like. The computing device is capable of communicating with the crowdsourcing platform servers and the database server by means of the network (e.g., using wired or wireless communication capabilities).

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

"A crowdsourcing platform" refers to a business application, wherein a broad, loosely defined external group of people, community, or organization provides solutions as outputs for any specific business processes received by the application as input. In an embodiment, the business application can be hosted online on a web portal (e.g., the crowdsourcing platform servers). Various examples of the crowdsourcing platforms include, but are not limited to, Amazon Mechanical Turk or Crowd Flower.

"Crowdworkers" refer to a worker or a group of workers that may perform one or more tasks that generate data that contribute to a defined result, such as proofreading part of a digital version of an ancient text or analyzing a small quantum of a large volume of data. According to the present disclosure, the crowdworkers include, but are not limited to, a satellite centre employee, a rural BPO (Business Process Outsourcing) firm employee, a home-based employee, or an internet-based employee. Hereinafter, "crowdsourced workforce," "crowdworker," "crowd workforce," and "crowd" may be interchangeably used.

"Task" refers to a job that can be undertaken by the crowdworker. The task can be accessed by remote users/crowdworkers from a crowdsourcing platform. Examples of the task may include, but is not limited to digitization, video annotation, image labeling, and the like.

"Parameters" refer to measurable characteristics of the tasks. Examples of the parameters may include, but are not limited to, task performance parameters (e.g., accuracy, response time, etc.), spatio temporal parameters (e.g., cost, number of judgments, etc.), and task characteristics parameters (e.g., cost, number of judgments, task category, etc.).

"Values" refer to the measurement of the parameters associated with the tasks. Examples of types of the measurement may include, but are not limited to, numerals, text, percentages, and the like.

"Requester's specifications" refer to details of the one or more tasks which are specified by a requester. In an embodiment, the requester's specifications contain values of one or more parameters associated with the one or more tasks.

"Externally observable characteristic" (EOC) refers to a parameter that can be collected or measured based on responses received from a crowdsourcing platform. Various examples of the EOC may include, but are not limited to, task performance measures (e.g., accuracy, response time, completion time, and the like), task characteristics (e.g., cost, number of judgments, and the like), and/or spatio-temporal measures (e.g., time of submission, day of week, worker origin, and the like).

"Batch completion time" refers to a time when the one or more tasks in a batch are to be completed based on requester's specifications.

"Batch completion rate" refers to a percentage of a batch to be completed within the batch completion time.

"Number of judgments" refers to a count of independent crowdworkers who are to be assigned the one or more tasks.

FIG. 1 is a block diagram illustrating a system environment 100 in accordance with at least one embodiment. Various embodiments of the methods and systems for recommending one or more crowdsourcing platforms from a plurality of the crowdsourcing platforms to a requester are implementable in the system environment 100. The system environment 100 includes a requester computing device 102, a network 104, an application server 106, and crowdsourcing platform servers (108a, 108b; hereinafter referred to as crowdsourcing platform servers 108). A user of the requester computing devices 102 is hereinafter referred to as a requester (e.g., who posts the tasks on the crowdsourcing platforms).

Although FIG. 1 shows only one type (e.g., a desktop computer) of the requester computing device 102 for simplicity, it will be apparent to a person having ordinary skill in the art that the disclosed embodiments can be implemented for a variety of computing devices including, but not limited to, a desktop computer, a laptop, a personal digital assistant (PDA), a tablet computer, and the like.

The crowdsourcing platform servers 108 are devices or computers that host a plurality of crowdsourcing platforms and are interconnected to the requester computing device 102 over the network 104. The plurality of crowdsourcing platforms accepts the one or more tasks from the requester computing device 102 and sends back responses for the crowdsourced tasks to the requester. Examples of the crowdsourced tasks include, but are not limited to, digitization of forms, translation of a literary work, multimedia annotation, content creation and the like.

In an embodiment, an application/tool/framework for recommending the one or more crowdsourcing platforms may be hosted on the application server 106. In another embodiment, the application/tool/framework for recommending the one or more crowdsourcing platforms from the plurality of crowdsourcing platforms may be installed as a client application on the requester computing device 102.

The application receives requester's specifications/preferences over the network 104 and provides recommendation of one or more crowdsourcing platforms from the plurality of crowdsourcing platforms to the requester (on the web-based interface) over the network 104. The application forwards the one or more tasks to a selected crowdsourcing platform over the network 104 based on a request from the requester. The application receives responses from the selected crowdsourcing platform for the crowdsourced tasks over the network 104 which are then forwarded to the requester over the network 104.

Figure 2:
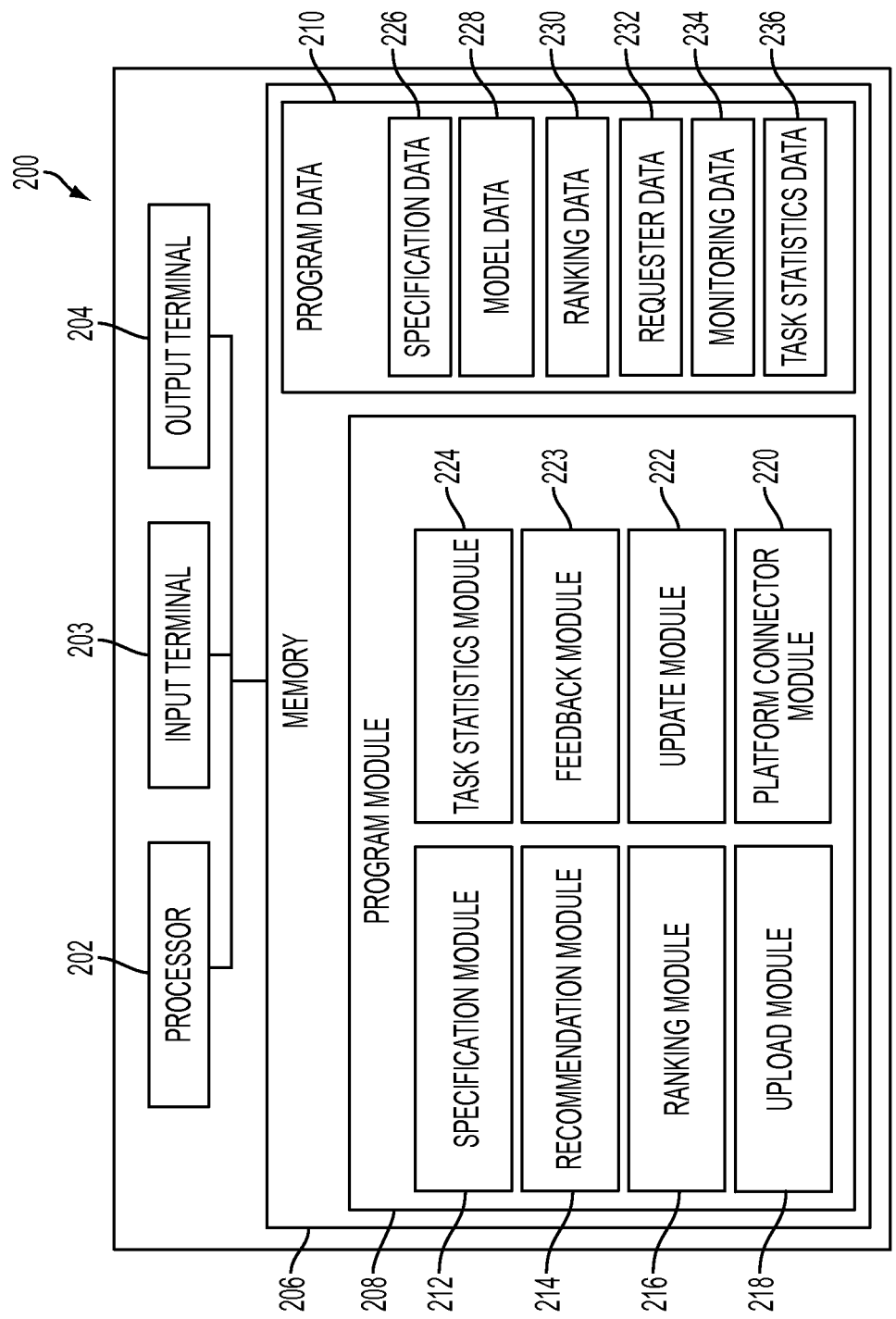
FIG. 2 is a block diagram illustrating a system, in accordance with at least one embodiment.

FIG. 2 is a block diagram illustrating a system 200 in accordance with at least one embodiment. The system 200 (hereinafter alternatively referred to as CrowdUtility 200) may correspond to any of the application server 106 or the requester computing device 102.

The system 200 includes a processor 202, an input terminal 203, an output terminal 204, and a memory 206. The memory 206 includes a program module 208 and a program data 210. The program module 208 includes a specification module 212, a recommendation module 214, a ranking module 216, an upload module 218, a platform connector module 220, an update module 222, a feedback module 223, and a task statistics module 224. The program data 210 includes a specification data 226, a model data 228, a ranking data 230, a requester data 232, a monitoring data 234, and a task statistics data 236. In an embodiment, the memory 206 and the processor 202 may be coupled to the input terminal 203 and the output terminal 204 for one or more inputs and display, respectively.

The processor 202 executes a set of instructions stored in the memory 206 to perform one or more operations. The processor 202 can be realized through a number of processor technologies known in the art. Examples of the processor 202 include, but are not limited to, an X86 processor, a RISC processor, an ASIC processor, a CISC processor, or any other processor. In an embodiment, the processor 202 includes a Graphics Processing Unit (GPU) that executes the set of instructions to perform one or more image processing operations.

The input terminal 203 receives the requester's specifications/preferences and a request for selecting and/or uploading tasks from the requester. The output terminal 204 displays the recommendations and feedback of one or more crowdsourcing platforms.

The memory 206 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 208 includes a set of instructions that are executable by the processor 202 to perform specific actions such as recommending the one or more crowdsourcing platforms. It is understood by a person having ordinary skill in the art that the set of instructions in conjunction with various hardware of the CrowdUtility 200 enable the CrowdUtility 200 to perform various operations. During the execution of instructions, the specification data 226, the model data 228, the ranking data 230, the requester data 232, the monitoring data 234, and the task statistics data 236 may be accessed by the processor 202.

The specification module 212 receives requester's specifications containing details of the one or more tasks to be crowdsourced which may include, but is not limited to, a task category, a task description, a batch size, and a batch specification. The batch specification may further include one or more parameters such as, task accuracy, response time, cost, completion time, completion rate, number of judgments, and the like. In an embodiment, the one or more parameters correspond to externally observable characteristics (EOCs) of the plurality of crowdsourcing platforms (The parameters may hereinafter be alternatively referred to as the EOC). The specification module 212 stores the values received of the one or more parameters from the requester's specifications in the specification data 226.

The recommendation module 214 retrieves one or more statistical models maintained for the one or more crowdsourcing platforms from the model data 228. The creation of the one or more statistical models is discussed later under the operation of the task statistics module 224. The one or more statistical models are associated with probabilities of the one or more crowdsourcing platforms in executing the one or more tasks based on the behavior of the one or more crowdsourcing platforms from past task statistics. The recommendation module 214 determines confidence measures of the one or more crowdsourcing platforms based on the probabilities of the one or more statistical models. The recommendation module 214 then recommends the one or more crowdsourcing platforms with the associated confidence measures and displays the recommendation to the requester on the output terminal 204. The determined confidence measures of the one or more crowdsourcing platforms are stored in the task statistics data 236.

The ranking module 216 retrieves the task statistics data 236 and ranks the one or more crowdsourcing platforms based on the confidence measures of the one or more crowdsourcing platforms stored in the task statistics data 236. The ranked data of the one or more crowdsourcing platforms is stored in the ranking data 230. In an embodiment, the ranking module 216 facilitates the display of the one or more crowdsourcing platforms as an ordered list in a descending order with the confidence measures. In an embodiment, the one or more crowdsourcing platforms ranked lower are either farther away from the requester's specifications or the CrowdUtility 200 has lesser confidence in the crowdsourcing platform meeting the requester's specifications, or both. In an embodiment, the recommendation module 214 and the ranking module may be configured as a single module and the combined recommendation and ranking may be done by this combined module.

The upload module 218 retrieves the requester data 232 and uploads the one or more tasks to be crowdsourced to the selected crowdsourcing platform based on a first request and a second request from the requester. In an embodiment, the CrowdUtility 200 selects one crowdsourcing platform from the ordered list based on the first request through the input terminal 203 from the requester and the selected data is stored in the requester data 232. In an embodiment, the second request includes the one or more tasks to be crowdsourced and a choice of the one or more EOCs to be monitored by the requester.

The platform connector module 220 receives responses corresponding to the crowdsourced one or more tasks from the selected crowdsourcing platform and stores the responses in the task statistics data 236.

The update module 222 determines the values of the one or more EOCs from the task statistics data 236 of the selected crowdsourcing platform and updates the one or more statistical models maintained for the selected crowdsourcing platform in the model data 228. In an embodiment, the one or more EOCs may include, but is not limited to, task performance measures, task characteristics, and spatio-temporal measures. Furthermore, the task performance measures may include, but is not limited to, accuracy, response time, completion time, etc. The task characteristics may include, but is not limited to, cost, number of judgments, task category, etc. The spatio-temporal measures may include, but is not limited to, time of submission, day of week, worker origin, etc. In an embodiment, the update module 222 stores the values of the one or more EOCs to be monitored contained in the second request by the requester in the monitoring data 234.

The feedback module 223 retrieves the monitoring data 234 and generates a feedback of the one or more crowdsourcing platforms based on the values of the one or more EOCs in the monitoring data 234. In an embodiment, the feedback containing the values of the one or more EOCs in the monitoring data 234 is displayed to the requester on the output terminal 204.

The task statistics module 224 retrieves the task statistics data 236 and creates the one or more statistical models for the plurality of crowdsourcing platforms. The one or more statistical models are created over a period of time based on the responses received from the plurality of crowdsourcing platforms for one or more sample tasks.

The task statistics module 224 creates the one or more statistical models for the plurality of crowdsourcing platforms using pattern classification methods that include, but are not limited to, a discriminant function, a probability distribution function, or a generative model function. The description of the pattern classification methods and its mathematical expressions are explained below:

The values of the one or more EOCs provided in the requester's specifications may contain heterogeneous data, which is a combination of real-valued numbers (e.g., accuracy), discrete-valued numbers (e.g., number of judgments) and nominal data (e.g., day of week). In an embodiment, non-metric pattern classification which may include, but is not limited to, decision trees or random forests are used with the heterogeneous data. In another embodiment, non-metric pattern classification which may include, but is not limited to, non-parametric classifiers (e.g., K-Nearest Neighbors), generalized linear models (e.g., logistic regression) and non-linear techniques (e.g., neural networks or kernel methods) are used. All these approaches use the discriminant function to create the one or more statistical models for the one or more crowdsourcing platforms. The discriminant function using decision trees or ensemble methods adequately describe the behavior of the plurality of crowdsourcing platforms in the one or more statistical models from past task statistics and provide reliable confidence measures. The one or more statistical models are updated each time new data is collected from the requester's specifications and the recommendations are sensitive to the choice of data. Table-1 depicts the changes in the recommendation provided by the CrowdUtility 200 with changes in day of the week and time of the day (keeping all other ECO's constant).

TABLE 1

| CrowdUtility Recommendations for varying values of EOCs | | | | | | | |
|---|---|---|---|---|---|---|---|
| Cost ($) | Accuracy (%) | Completion Time | Completion Ratio | Judgments | Day | Hour | Platform |
| 1 | 95 | 24 minutes | 95 | 1 | Monday | 5:00 PM | CF |
| 1 | 95 | 24 minutes | 95 | 1 | Sunday | 5:00 PM | MW |
| 1 | 95 | 24 minutes | 95 | 1 | Saturday | 9:00 AM | MW |
| 1 | 95 | 24 minutes | 95 | 1 | Saturday | 11:00 PM | CF |
| 1 | 95 | 10 minutes | 95 | 1 | Saturday | 9:00 AM | MW |
| 1 | 65 | 10 minutes | 95 | 1 | Saturday | 9:00 AM | CF |
| 1 | 95 | 10 minutes | 95 | 1 | Saturday | 9:00 AM | CF |
| 1 | 99 | 20 minutes | 99 | 1 | Saturday | 9:00 AM | MW |

In an alternate embodiment, the probability distribution function may be used. In this case, the plurality of crowdsourcing platforms is considered as classes. Consider Y to be a set of EOCs with the requirements contained in the requester's specifications. Consider P to be the set of crowdsourcing platforms from which the recommendation module 214 selects the one or more crowdsourcing platforms for recommendation. Using the probability distribution function, the probabilities of the plurality of crowdsourcing platforms is computed as:

$$Pr(p_i|y).$$

where
$p_i$ denotes the $i^{th}$ crowdsourcing platform in P,
y denotes a vector of the values of the one or more EOCs.

Once this probability distribution is learnt, for the set of EOCs Y contained in the requester's specifications, the probabilities for the plurality of crowdsourcing platforms are computed using the probability distribution function. These probabilities indicate the extent to which the plurality of crowdsourcing platforms can meet the task requirements of the requester. In an embodiment, the probability can be used to rank the plurality of crowdsourcing platforms for recommendations, wherein a higher probability indicates better rank of the crowdsourcing platforms. The probabilities may also be used as confidence measures during recommendation.

In another embodiment, the generative models may be used. Using the Bayes' classification theorem, the probabilities of the plurality of crowdsourcing platforms for a set of EOCs y is represented as:

$$Pr(p_i|y) = \frac{Pr(y|p_i)Pr(p_i)}{\sum Pr(y|p_i)}$$

To compute the probabilities, the set of EOCs Y are modeled on the plurality of crowdsourcing platforms using the 'Naive Bayes' assumption and may be represented as:

$$Pr(p_i \mid y) = Pr(p_i \mid y_1 \ldots y_j) \propto \prod_j Pr(y_i \mid p_1) Pr(p_i)$$

Here each EOC $y_j$ is modeled on each crowdsourcing platform $p_i$ in the plurality of crowdsourcing platforms.

The pattern classification methods were evaluated based on experimental results of the one or more sample tasks posted on the plurality of crowdsourcing platforms. In order to model the plurality of crowdsourcing platforms the one or more sample tasks were posted by the task statistics module 224 on the plurality of crowdsourcing platforms. From the responses received in the task statistics data 236 from the plurality of crowdsourcing platforms over a period of time the one or more statistical models for the plurality of crowdsourcing platforms were created. In an embodiment, part of the one or more sample tasks were used as a training set and the remaining as a test set to validate the efficacy of the one or more statistical models.

In an embodiment, for example, the one or more sample tasks of digitizing insurance forms of a healthcare provider posted on the plurality of crowdsourcing platforms provided performance characteristics and crowdworker specific information. The task statistics data 236 corresponding to the one or more EOCs were presented to the classifiers stated earlier and the one or more statistical models of the plurality of crowdsourcing platforms were created and stored in the model data 228.

In this example, the task statistics data 236 from the experiments observed the following one or more EOCs for a batch containing the one or more sample tasks such as fields/task, judgments/task, time of posting the batch, day of the week of posting the batch, batch completion time (in minutes/seconds), batch completion rate (fraction of the batch completed in the stipulated time), accuracy of the batch (measured as the minimum percentage across all tasks in the batch), and cost/payment (in dollars) for the batch.

In an embodiment, the task statistics module 224 models the plurality of crowdsourcing platforms by learning the dynamic characteristics of the plurality of crowdsourcing platforms using machine learning methods. The recommendation module 214 recommends the one or more crowdsourcing platforms using these created one or more statistical models.

Figure 3:
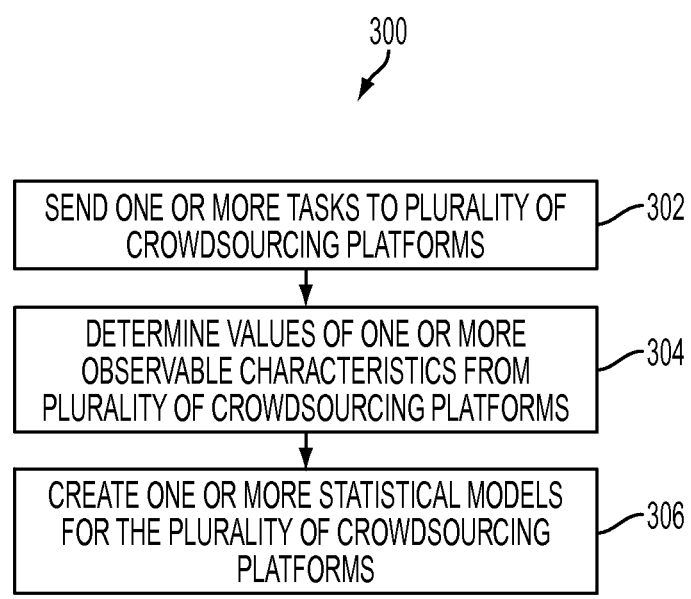
FIG. 3 is a flow diagram illustrating a method for modeling a plurality of crowdsourcing platforms, in accordance with at least one embodiment.

FIG. 3 is a flow diagram 300 illustrating a method for modeling the plurality of crowdsourcing platforms, in accordance with at least one embodiment. The plurality of crowdsourcing platforms are modeled based on the task statistics data 236. The CrowdUtility 200 uses the following method:

At step 302, the upload module 218 sends one or more tasks to the plurality of crowdsourcing platforms. In an embodiment, for example, the one or more tasks are sample tasks pertaining to a specific type of work such as digitization of a filled form, translation of text, etc. In an embodiment, the answers/responses of the sample tasks are known.

At step 304, the update module 222 determines the values of the one or more EOCs from the plurality of crowdsourcing platforms. The values of the one or more EOCs are determined by comparing the data received in the responses from the plurality of crowdsourcing platforms for the one or more sample tasks with one or sample data contained in the task statistics data 236. In an embodiment, for example, in digitization of a filled form, the digitized forms contained in the responses are compared with sample digitized forms to determine the accuracy of the plurality of crowdsourcing platforms in meeting the task requirements. The determined values of accuracy of the plurality of crowdsourcing platforms are stored in the task statistics data 236.

At step 306, the task statistics module 224 creates the one or more statistical models for the plurality of crowdsourcing platforms. The task statistics module 224 retrieves the values of the one or more EOCs contained in the task statistics data 236 for the one or more sample tasks and creates one or more statistical models for the plurality of crowdsourcing platforms using the pattern classification methods described earlier. The one or more statistical models are created of the plurality of crowdsourcing platforms based on the likelihood to meet the task requirements of the requester.

Figure 4:
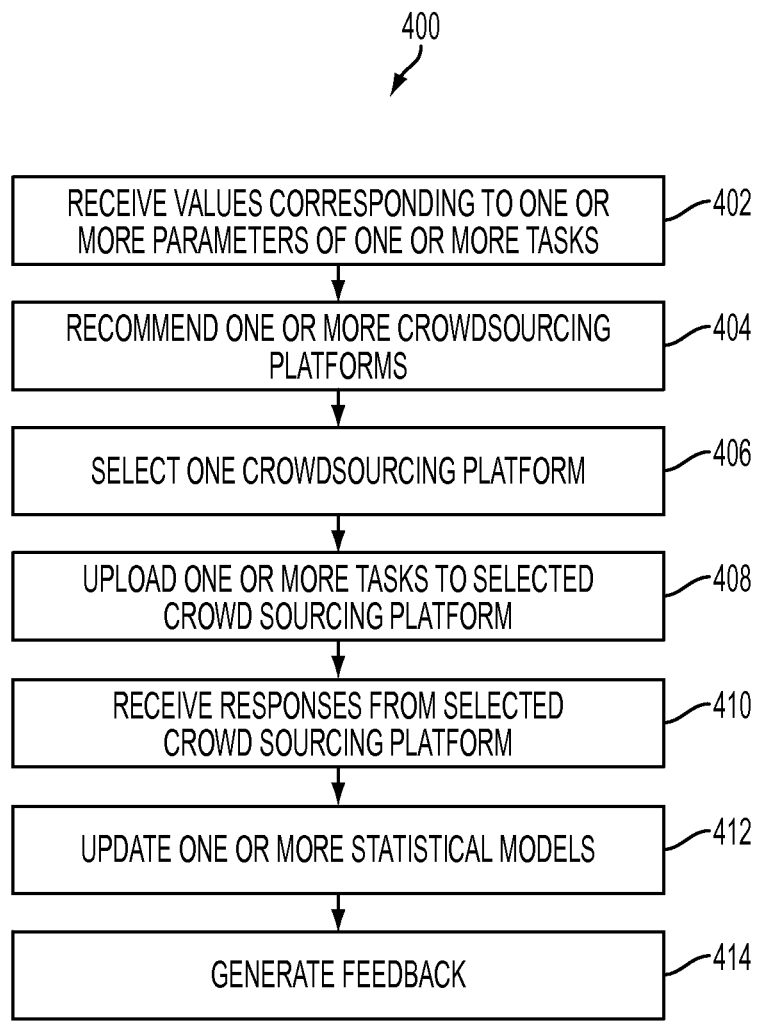
FIG. 4 is a flow diagram illustrating a method for recommending one or more crowdsourcing platforms, in accordance with at least one embodiment.
Figure 5A:
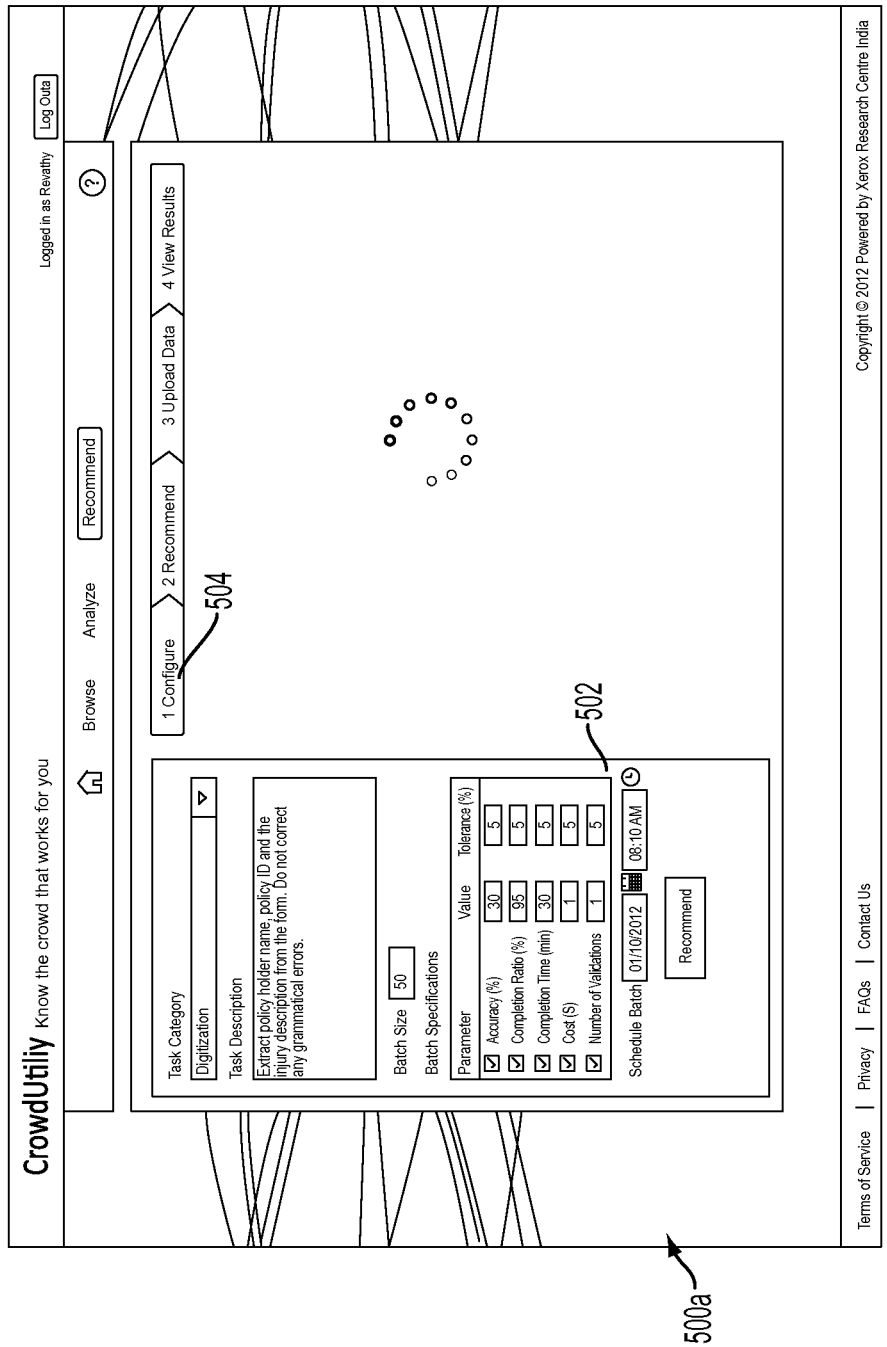

FIG. 4 is a flow diagram 400 illustrating a method for recommending the plurality of crowdsourcing platforms, in accordance with at least one embodiment. The CrowdUtility 200 uses the following method:

At step 402, the specification module 212 receives various desired values of the one or more EOCs of the one or more tasks to be crowdsourced from the requester. The specification module 212 stores the values received for the one or more EOCs from the requester's specifications in the specification data 226. In an embodiment, the specification module 212 receives requester's specifications which may include, but is not limited to, task category, task details, batch size, batch specifications, etc. For example, the task category is digitization, batch size is 50, desired task accuracy is 50 percent, completion time is 2 hours, etc. In an embodiment, the requester's specifications may also contain a range (tolerance value) for the values in the batch specifications.

At step 404, the recommendation module 214 recommends the one or more crowdsourcing platforms. The recommendation module 214 retrieves one or more statistical models from the model data 228 maintained for the one or more crowdsourcing platforms. In an embodiment, the recommendation module 214 determines the confidence measures of the one or more crowdsourcing platforms based on the probabilities of the corresponding one or more statistical models in meeting the requester's specifications and displays it to the requester on the output terminal 204.

At step 406, the upload module 218 selects one crowdsourcing platform from the one or more recommended crowdsourcing platforms based on the first request. In an embodiment, the upload module 218 receives the first request from the requester indicating the requester's selection of one crowdsourcing platform from the recommended one or more crowdsourcing platforms based on an entry in the requester data 232.

At step 408, the upload module 218 uploads the one or more tasks to be crowdsourced to the selected crowdsourcing platform based on the second request. In an embodiment, the upload module 218 receives the second request from the requester for uploading the one or more tasks.

At step 410, the platform connector module 220 receives responses from the selected crowdsourcing platform. The platform connector module 220 stores the information contained in the responses in the tasks statistics data 236.

At step 412, the update module 222 updates the one or more statistical models. The update module 222 determines the values of the one or more EOCs from the task statistics data 236 and updates the one or more statistical models maintained for the selected crowdsourcing platform. In an embodiment, the update module 222 stores the values of the one or more EOCs to be monitored by the requester contained in the second request in the monitoring data 234.

At step 414, the feedback module 223 generates the feedback of the one or more crowdsourcing platforms. The feedback module 223 retrieves the monitoring data 234 and generates a feedback of the one or more crowdsourcing platforms based on the values of the one or more EOCs in the monitoring data 234. In an embodiment, the feedback module displays the values of the one or more EOCs to the requester (on the web based interface).

FIGS. 5A, 5B, 5C, and 5D depict various user interfaces (500a, 500b, 500c, and 500d), in accordance with at least one embodiment. Although FIGS. 5A, 5B, 5C, and 5D only describe web-based interfaces (500a, 500b, 500c, and 500d) for the requester to post the one or more tasks to be crowdsourced to the plurality of crowdsourcing platforms through the CrowdUtility 200, it will be apparent to a person having ordinary skill in the art that the disclosed embodiments can be implemented with alternative types of interfaces displayable on a variety of computing devices including, but not limited to, a desktop computer, a laptop, a personal digital assistant (PDA), a tablet computer, and the like.

The web-based interfaces (500a, 500b, 500c, and 500d) have a common configure panel 502 for accepting requester' specifications. In these web-based interfaces (500a, 500b, 500c, and 500d), the requester may choose to provide the task category, task description, batch size, and the batch specifications of the one or more tasks to be crowdsourced. Further, the requester may provide a count of the total tasks in a batch. Also, the requester may provide expected values for the one or more EOCs in the batch specifications and a percentage for the tolerance value which indicates how much deviation in percentage from the required value the requester is willing to tolerate. In an embodiment, when the requester clicks on a recommend button on the configure panel 502, the web-based interface 500a configures the requester's specifications and stores the values contained in the requester's specifications in the specification data 226.

The web-based interface 500b (refer to FIG. 5B) displays the recommended one or more crowdsourcing platforms from the plurality of crowdsourcing platforms based on the one or more statistical models maintained for the one or more crowdsourcing platforms under the recommend tab 506. The requester may choose one crowdsourcing platform under the recommend tab 506 for uploading the one or more tasks to be crowdsourced.

The web-based interface 500c (refer to FIG. 5C) displays the upload tab 508 where the requester may upload the one or more tasks to be crowdsourced to the selected crowdsourcing platform. In an embodiment, the requester may click on an upload button under the upload tab 508 to upload the one or more tasks to be crowdsourced. In this case, the requester may choose to select the one or more EOCs of the batch specifications for monitoring the results. In an embodiment, the requester may obtain the recommendation at a future time slot and schedule the upload of the one or more tasks to be crowdsourced for later by using the time selection under schedule batch.

The web-based interface 500d (refer to FIG. 5D) displays the results tab 510 where the requester views the results of the one or more EOCs selected for monitoring after the one or more uploaded tasks are executed completely.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as, a floppy disk drive, optical disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. The method helps in creating and maintaining the one or more statistical models based on the dynamic performance characteristics of the plurality of crowdsourcing platforms and assigning tasks to crowdsourcing platforms in real-time which meet the requirements of the tasks. The one or more statistical models for recommending the one or more crowdsourcing platforms use the EOCs and need not have to know the internal complexities of the one or more crowdsourcing platforms. By using the random forests and extremely random trees as classifiers the one or more statistical models created have reduced variation in meeting the task requirements. The one or more statistical models are created considering the discriminatory features such as accuracy, completion time, day of week, and hour of day. Furthermore, the Crowd Utility 200 enables the requester to post the one or more tasks to be crowdsourced to one of the plurality of crowdsourcing platforms with performance guarantees that meet the task requirements of the requester.

Various embodiments of the methods and systems for recommending one or more crowdsourcing platforms from a plurality of the crowdsourcing platforms to a requester have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for recommending one or more crowdsourcing platforms, from a plurality of crowdsourcing platforms, to a requester, the computer-implemented method comprising:
   receiving, by one or more processors, one or more values corresponding to one or more requirement parameters associated with one or more tasks from the requester, wherein a tolerance value is received for each of the one or more requirement parameters;
   determining, by the one or more processors, one or more values corresponding to one or more observable characteristics associated with each of the plurality of crowdsourcing platforms based on one or more responses received from the plurality of the crowdsourcing platforms for one or more sample tasks;
   retrieving, by the one or more processors, a plurality of statistical models from model data maintained for the plurality of crowdsourcing platforms, wherein the plurality of statistical models are associated with probabilities of the plurality of crowdsourcing platforms in executing the one or more tasks based on behavior of the plurality of crowdsourcing platforms from historic task statistics data;
   determining, by the one or more processors, a confidence score of each of the plurality of crowdsourcing platforms meeting the one or more requirement parameters associated with the one or more tasks, based on: a probability of each of the plurality of statistical models, the one or more requirement parameters, and the tolerance value of each of the one or more requirement parameters; and
   recommending, by the one or more processors, the one or more crowdsourcing platforms, based on the confidence score.

2. The computer-implemented method according to claim 1, wherein the probability of each of the plurality of crowdsourcing platforms is computed using at least one of a discriminant function, a probability distribution function, or a generative model function on the one or more values corresponding to the one or more observable characteristics.

3. The computer-implemented method according to claim 1 further comprising ranking, by the one or more processors, the one or more crowdsourcing platforms based on the confidence score.

4. The computer-implemented method according to claim 1 further comprising receiving, by the one or more processors, a first request, from the requester, for selecting one crowdsourcing platform from the one or more crowdsourcing platforms for the one or more tasks.

5. The computer-implemented method according to claim 4 further comprising receiving, by the one or more processors, a second request, from the requester, for uploading the one or more tasks on the selected crowdsourcing platform.

6. The computer-implemented method according to claim 5 further comprising sending, by the one or more processors, the one or more tasks, based on the second request to the selected crowdsourcing platform.

7. The computer-implemented method according to claim 1,
   wherein the one or more observable characteristics correspond to task performance measures, task characteristics, and spatio-temporal measures,
   wherein the task performance measures comprise at least one of accuracy, response time, or completion time,
   wherein the task characteristics comprise at least one of cost, number of judgments, or task category, and
   wherein the spatio-temporal measures comprise at least one of time of submission, day of week, or worker origin.

8. The computer implemented method of claim 1 further comprising generating, by the one or more processors, a statistical model for each of the plurality of crowdsourcing platforms based on the one or more values corresponding to the one or more observable characteristics associated with respective crowdsourcing platform from the plurality of crowdsourcing platforms.

9. The computer-implemented method according to claim 8 further comprising updating, by the one or more processors, the statistical model for each of the plurality of crowdsourcing platforms based on one or more responses received for the one or more tasks.

10. The computer-implemented method according to claim 9, wherein the statistical model for each of the plurality of crowdsourcing platforms is updated by determining the one or more values corresponding to the one or more observable characteristics based on the one or more responses received from each of the plurality of crowdsourcing platforms.

11. A system for recommending one or more crowdsourcing platforms, from a plurality of crowdsourcing platforms, to a requester, the system comprising:
one or more processors configured to:
receive one or more values corresponding to one or more requirement parameters associated with one or more tasks, wherein a tolerance value is received for each of the one or more requirement parameters;
determine one or more values corresponding to one or more observable characteristics associated with each of the plurality of crowdsourcing platforms based on one or more responses received from the plurality of the crowdsourcing platforms for one or more sample tasks;
retrieve a plurality of statistical models from model data maintained for the plurality of crowdsourcing platforms, wherein the plurality of statistical models are associated with probabilities of the plurality of crowdsourcing platforms in executing the one or more tasks based on behavior of the plurality of crowdsourcing platforms from historic task statistics data;
determine a confidence score of each of the plurality of crowdsourcing platforms meeting the one or more requirement parameters associated with the one or more tasks, based on: a probability of each of the plurality of statistical models, the one or more requirement parameters, and the tolerance value of each of the one or more requirement parameters; and
recommend the one or more crowdsourcing platforms based on the confidence score.

12. The system according to claim 11, wherein the one or more processors are further configured to rank the one or more crowdsourcing platforms based on the confidence score.

13. The system according to claim 11, wherein the one or more processors are further configured to:
receive a first request to select one crowdsourcing platform from the one or more crowdsourcing platforms for the one or more tasks; and
upload the one or more tasks to the selected crowdsourcing platform based on a second request.

14. The system according to claim 13, wherein the one or more processors are further configured to receive the one or more responses corresponding to the one or more tasks from the selected crowdsourcing platform.

15. The system according to claim 14, wherein the one or more processors are further configured to:
determine one or more values corresponding to the one or more observable characteristics based on the one or more responses received for the one or more tasks from the selected crowdsourcing platform,
wherein the one or more observable characteristics correspond to task performance measures, task characteristics, and spatio-temporal measures,
wherein the task performance measures comprise at least one of accuracy, response time, or completion time,
wherein the task characteristics comprise at least one of cost, number of judgments, or task category, and
wherein the spatio-temporal measures comprise at least one of time of submission, day of week, or worker origin.

16. The system according to claim 15, wherein the one or more processors are further configured to generate a feedback of the one or more crowdsourcing platforms based on the one or more values of the one or more observable characteristics.

17. The system according to claim 11, wherein the one or more processors are further configured to store performance statistics of the one or more requirement parameters associated with the one or more tasks.

18. A computer program product for use with a computer, the computer program product comprising a non-transitory computer-usable medium storing a computer-readable program code for recommending one or more crowdsourcing platforms from a plurality of the crowdsourcing platforms to a requester, the computer-readable program is executable by one or more processors in the computer to:
receive one or more values corresponding to one or more requirement parameters associated with one or more tasks, wherein a tolerance value is received for each of the one or more requirement parameters;
determine one or more values corresponding to one or more observable characteristics associated with each of the plurality of crowdsourcing platforms based on one or more responses received from the plurality of the crowdsourcing platforms for one or more sample tasks;
retrieve a plurality of statistical models from model data maintained for the plurality of crowdsourcing platforms, wherein the plurality of statistical models are associated with probabilities of the plurality of crowdsourcing platforms in executing the one or more tasks based on behavior of the plurality of crowdsourcing platforms from historic task statistics data;
determine a confidence score of each of the plurality of crowdsourcing platforms meeting the one or more requirement parameters associated with the one or more tasks, based on: a probability of each of the plurality of statistical models, the one or more requirement parameters, and the tolerance value of each of the one or more requirement parameters; and
recommend the one or more crowdsourcing platforms based on the confidence score.

* * * * *